US012039902B2

(12) United States Patent
Adusumalli

(10) Patent No.: US 12,039,902 B2
(45) Date of Patent: Jul. 16, 2024

(54) TEMPERATURE SENSOR ARRANGEMENT, LIGHT SENSOR ARRANGEMENT, MOBILE COMPUTING DEVICE INCLUDING THE SAME AND METHODS USING THE SAME

(71) Applicant: ams International AG, Jona (CH)

(72) Inventor: Ravi Kumar Adusumalli, Eindhoven (NL)

(73) Assignee: AMS INTERNATIONAL AG, Jona (CH)

( * ) Notice: Subject to any disclaimer, the term of this patent is extended or adjusted under 35 U.S.C. 154(b) by 692 days.

(21) Appl. No.: 17/271,309

(22) PCT Filed: Aug. 19, 2019

(86) PCT No.: PCT/EP2019/072123
§ 371 (c)(1),
(2) Date: Feb. 25, 2021

(87) PCT Pub. No.: WO2020/043527
PCT Pub. Date: Mar. 5, 2020

(65) Prior Publication Data
US 2021/0343205 A1    Nov. 4, 2021

(30) Foreign Application Priority Data
Aug. 29, 2018   (EP) ..................... 18191502

(51) Int. Cl.
*G09G 3/00*       (2006.01)
*G01J 1/42*       (2006.01)
(Continued)

(52) U.S. Cl.
CPC ............ *G09G 3/006* (2013.01); *G01J 1/4204* (2013.01); *G01J 1/44* (2013.01); *G01K 7/20* (2013.01);
(Continued)

(58) Field of Classification Search
CPC .... G09G 3/006; G09G 5/10; G09G 2320/041; G09G 2360/141; G09G 2360/144;
(Continued)

(56) References Cited

U.S. PATENT DOCUMENTS 5,351,010 A   9/1994  Leopold et al.
6,023,053 A   2/2000  Nakayama et al.
(Continued)

FOREIGN PATENT DOCUMENTS

CN    1236891 A    12/1999
CN    1991319 A    7/2007
(Continued)

OTHER PUBLICATIONS

"Smart Temperature Sensors in Standard CMOS" by K.A.A. Makinwa, from Proceda Engineering, copyright 2010.*
(Continued)

*Primary Examiner* — Randy W Gibson
(74) *Attorney, Agent, or Firm* — MH2 TECHNOLOGY LAW GROUP LLP

(57) ABSTRACT

A temperature sensor arrangement includes a current integrating modulator that provides a count value dependent on the current supplied to its input terminal. A temperature-sensitive element includes a resistor to generate a current dependent on temperature. First and second switches alternately connect the temperature-sensitive element and another resistor to the input terminal of the current integrating modulator. The temperature sensor arrangement can be combined with an ambient light sensor sharing the current integrating modulator.

12 Claims, 2 Drawing Sheets

(51) Int. Cl.
*G01J 1/44* (2006.01)
*G01K 7/16* (2006.01)
*G01K 7/20* (2006.01)
*G09G 3/10* (2006.01)
*G09G 5/10* (2006.01)

(52) U.S. Cl.
CPC .......... *G09G 5/10* (2013.01); *G01J 2001/446* (2013.01); *G01K 7/16* (2013.01); *G09G 2320/041* (2013.01); *G09G 2360/141* (2013.01); *G09G 2360/144* (2013.01)

(58) Field of Classification Search
CPC ...... G01J 1/4204; G01J 1/44; G01J 2001/446; G01K 7/20; G01K 7/16
See application file for complete search history.

(56) References Cited

U.S. PATENT DOCUMENTS

| | | | | |
|---|---|---|---|---|
| 7,091,713 | B2* | 8/2006 | Erdelyi | G05F 3/30 323/907 |
| 7,626,346 | B2* | 12/2009 | Scilla | H05B 45/18 315/307 |
| 7,724,068 | B1* | 5/2010 | Smith | G01K 3/005 327/539 |
| 8,179,115 | B2* | 5/2012 | Wang | G05F 3/30 327/539 |
| 8,269,548 | B2* | 9/2012 | Huang | G05F 3/30 327/513 |
| 8,596,864 | B2 | 12/2013 | Peterson | |
| 9,141,124 | B1* | 9/2015 | Nien | G05F 3/30 |
| 9,146,162 | B2 | 9/2015 | Xu | |
| 9,948,288 | B2* | 4/2018 | Yoshimoto | H03F 3/45475 |
| 11,431,324 | B1* | 8/2022 | Finlinson | G05F 3/30 |
| 2004/0239303 | A1 | 12/2004 | Feng | |
| 2006/0192597 | A1 | 8/2006 | Johns et al. | |
| 2007/0146047 | A1 | 6/2007 | Senriuchi et al. | |
| 2008/0174464 | A1 | 7/2008 | Robert | |
| 2011/0227636 | A1 | 9/2011 | Endo et al. | |
| 2014/0293272 | A1 | 10/2014 | Xu | |
| 2014/0355650 | A1 | 12/2014 | Hong et al. | |
| 2015/0207497 | A1 | 7/2015 | Lee | |
| 2015/0263752 | A1 | 9/2015 | Kon et al. | |
| 2016/0252923 | A1* | 9/2016 | Nien | G05F 3/262 323/313 |
| 2018/0073938 | A1 | 3/2018 | Buter | |

FOREIGN PATENT DOCUMENTS

| | | |
|---|---|---|
| CN | 101231192 A | 7/2008 |
| CN | 201561800 U | 8/2010 |
| CN | 102622031 A | 8/2012 |
| CN | 104570789 A | 4/2015 |
| CN | 107817060 A | 3/2018 |
| EP | 2787331 A1 | 10/2014 |
| EP | 3070446 A1 | 9/2016 |
| EP | 3447481 A1 | 2/2019 |
| GB | 2514576 A | 12/2014 |
| JP | H-0563273 A | 3/1993 |
| JP | 2014232107 A1 | 12/2014 |

OTHER PUBLICATIONS

"Silicon Bandgap Temperature Sensor" from Wikipedia, unpdated Jan. 4, 2023.*

International Search Report and Written Opinionin corresponding International Application No. PCT/EP2019/072123 mailed on Oct. 21, 2019, 10 pages.

Shi, H., Chinese Office Action issued in corresponding Chinese Patent Application No. 2019800570542 dated Mar. 29, 2024, with English language translation, 20 pages.

* cited by examiner

TEMPERATURE SENSOR ARRANGEMENT, LIGHT SENSOR ARRANGEMENT, MOBILE COMPUTING DEVICE INCLUDING THE SAME AND METHODS USING THE SAME

CROSS-REFERENCE TO RELATED APPLICATIONS

The present application is the national stage entry of International Patent Application No. PCT/EP2019/072123, filed on Aug. 19, 2019, which claims benefit of priority of European Patent Application No. 18191502.6 filed on Aug. 29, 2018, all of which are hereby incorporated by reference in their entirety for all purposes.

TECHNICAL FIELD

The present disclosure relates to a temperature sensor arrangement. Specifically, the present disclosure relates to a temperature sensor arrangement that includes a current integrating modulator and a temperature-sensitive element to generate a current dependent on temperature. The present disclosure also relates to a light sensor arrangement that includes a temperature sensor arrangement and a photodiode to generate a photocurrent to be measured. The present disclosure also relates to a mobile computing device that includes a light sensor arrangement. The present disclosure furthermore relates to a method to measure a temperature and to a method to measure ambient light including the method to measure a temperature.

BACKGROUND

Temperature sensors are widely used in electronic devices to measure the temperature and control the operation of the device in dependence on the determined temperature. A temperature sensor generates a signal that depends on temperature and changes with varying temperature such as a temperature-dependent electrical current. The temperature-dependent current may be a current proportional to absolute temperature (IPTAT). The temperature-dependent current is converted to a digital signal that may be further used to control the electronic device or to output from the device to be displayed or to be available to control other equipment. The current-to-digital conversion may be performed by an analog-to-digital modulator performing a current integrating modulation process. The temperature measurement can be combined with the measurement of other physical entities such as ambient light, thereby sharing the same current integrating modulator circuitry. A combined ambient light and temperature sensor is described in U.S. Pat. No. 9,146,162 B2.

The temperature measurement using a current integrating modulator and an IPTAT temperature-dependent current source may provide sufficient accuracy for many technical applications. However, the manufacturing process for the IPTAT is subject to inherent process variations so that the manufactured temperature sensor arrangement may require substantial calibration processing or the determined temperature value may be less accurate. Furthermore, the operating temperature of the temperature measurement circuit may introduce additional variations which are difficult to compensate.

SUMMARY

According to an embodiment, a temperature sensor arrangement comprises a current integrating modulator that has an input terminal to receive an input current and an output terminal to provide a count value dependent on the input current supplied to the input terminal. The current integrating modulator performs an analog-to-digital conversion translating an analog current to a digital signal using an integrating modulating process. The current integrating modulator integrates the input current onto an integrating capacitor. When the capacitor charge or voltage crosses a threshold value, a reference charge is subtracted from the integrating capacitor which triggers a counter. The integrating operation is continued during a predetermined time window. The subtracting and counting events that occur within the time window are indicative for the amount of input current.

A temperature-sensitive element generates a current that depends on temperature, wherein an increasing temperature generates an increasing electrical current. Practically, the current may be proportional or substantially proportional to the absolute temperature. The temperature-sensitive element may include electronic components such as transistors and at least one resistor that determine the current.

According to an aspect of the present disclosure, another resistor is provided. Corresponding first and second switches are provided that connect the temperature-sensitive element and the other resistor to the input terminal to the current integrating modulator. The switches determine that only one of the temperature-sensitive element and the other resistor provide the current to the modulator input terminal. The first and second switches operate alternately so that either the current from the temperature-sensitive element or the current from the other resistor are input to the input terminal of the current integrating modulator.

In conventional temperature sensor arrangements it turns out that the value of the resistor in the temperature-sensitive element is subject to manufacturing process variations. In fact, it is difficult in semiconductor circuit manufacturing to produce a resistor having an accurate absolute resistance value. Process variations during the manufacturing of an integrated circuit cause a relatively wide range of variations of the resistance of a manufactured resistor. A similar situation applies for capacitors and, consequently, for the frequency of oscillators used on the integrated circuit, especially when the oscillator is an RC-oscillator disposed on the semiconductor chip. Furthermore, the parameters of the components within an integrated circuit exhibit a temperature drift so that their absolute values vary with varying temperature.

According to an aspect of the present disclosure the temperature sensor arrangement includes a resistor in the temperature-sensitive element and another resistor disposed in parallel to the temperature-sensitive element. According to the principles of integrated circuit manufacturing, it is straightforward to produce resistors having matching resistance values. Although their absolute resistance values may vary according to process variations, their relative relation of resistance values may be controlled rather precisely. Accordingly, the ratio of resistance values of the resistor and the other resistor realized in the same integrated circuit or disposed on the same integrated circuit according to an aspect of the present disclosure can be well controlled. The arrangement according to an aspect of the present disclosure determines a count value from the temperature-sensitive element including the resistor and another count value from the other resistor and derives a digital value representing the absolute temperature from the ratio metric measurement of both count values. Because the temperature behaviour of both resistors is the same as they are located on the same integrated circuit, the temperature drift is also cancelled out by the ratio metric measurement.

According to an embodiment, the resistor of the temperature-sensitive element and the other resistor have the same resistance. Even with unavoidable process variations during the manufacturing of an integrated circuit, it is relatively straightforward to generate two resistors having the same resistance, because the relative matching of resistors is relatively good when they are manufactured in the same manufacturing process using the same manufacturing steps.

According to an embodiment, the resistor of the temperature-sensitive element and the other resistor may be manufactured concurrently so that they are disposed on the same integrated circuit and benefit from the matching of resistors manufactured during the same manufacturing process. In general, it may be acceptable to use resistors of different resistance provided that they are manufactured on the same integrated circuit provided that the ratio between the resistor and the other resistor is known. Manufacturing the resistors on the same integrated circuit implies that the same process steps are used for the manufacturing of the resistor and the other resistor to manufacture them concurrently. As the matching of different resistors on the same integrated circuit is relatively good, the effects of absolute variations of the resistor value cancel out during the ratio metric measurement. The resistors may have, in general, any predetermined relation of resistance values including the same resistance or an integer multiple of resistances or any other ratio of resistances known to and determined by the circuit designer. The ratio of resistance values of the resistor in the temperature-sensitive element and the other resistor may include 1:1, 1:2, . . . , 1:N, with N being an integer number or a real number. The resistance of the resistor of the temperature-sensitive element may be larger than the resistance of the other resistor or may be smaller depending on the circuit designer's choice.

According to an embodiment, the temperature-sensitive element is connected through a first switch to the input terminal of the current integrating modulator and the other resistor is connected through a second switch to the input terminal of the current integrating modulator. The first and second switches are controlled to be alternately conductive. While the temperature-sensitive element is connected to the input terminal of the current integrating modulator, the other resistor is disconnected therefrom and vice versa. The current integrating modulator obtains a count value for the current supplied by the temperature-sensitive element and another count value for the current supplied by the other resistor. From the two obtained count values a digital signal representative of the absolute temperature is derived. Since the temperature-sensitive element includes a resistor matching to the other resistor, process variations that lead to varying absolute resistance values, nevertheless allow good relative matching between resistors on the same integrated circuit so that process variations are cancelled out of the final digital temperature value.

According to an embodiment, a calculator is connected downstream of the current integrating modulator. The calculator generates a value representative of the temperature from the count values generated by the current integrating modulator from the temperature-sensitive element and from the other resistor. The calculator may be integrated on the same integrated circuit as the temperature sensor arrangement including the current integrating modulator. The calculator may also be realized by a microprocessor which, in this case, may be separate from the chip that incorporates temperature sensor and modulator. The calculator may perform a calculation that determines a digital value representative of the absolut temperature from a ratio metric measurement that delivers a ratio of count values of the modulation result from the absolut temperature sensor and the other resistor. According to one embodiment, the calculation may include a linear regression that assumes a linear relation between count value ratios and temperature. Other second or higher order relations may also be useful.

According to an embodiment, the temperature-sensitive element may include a bandgap circuit that comprises at least two circuit paths, one of which includes a transistor and the resistor and the other one includes another transistor. The transistors may have different sizes, specifically, different collector widths so that the transistors supply different currents. The difference in size may be substantial such as N:1, wherein the transistor connected to the resistor has the collector width of N and the other transistor has the collector width of 1. The inputs of an amplifier are connected to the two circuit paths of the bandgap device and the output of the amplifier controls a current mirror circuit that supplies the current to the input of the current integrating modulator. The output path of the current mirror is coupled to the input terminal of the current integrating modulator. The combination of a bandgap device and an amplifier regulating a current from the different voltages in the paths of the bandgap device generates a current substantially proportional to the absolute temperature that is a current proportional to absolute temperature (IPTAT) device.

According to an embodiment, the output path of the temperature-sensitive element that generates an IPTAT current comprises a MOS transistor that has a drain source path that is connected serially with the first switch which is connected to the input terminal of the current integrating modulator. The other resistor which operates parallel to the temperature-sensitive element forms a series connection with the second switch which is connected to the input terminal of the current integrating modulator. Accordingly, the series connection of MOS transistor and first switch and the series connection of other resistor and second switch are connected in parallel to each other. The parallel connection is connected to the input terminal of the current integrating modulator and to ground potential. The additional expense for the other resistor and the second switch is almost negligible when compared to the remainder of the circuit. The area needed for the realization in an integrated circuit is very low compared to the increase in accuracy. The additional operating power consumed by the resistor and the corresponding current integration modulation process is reasonable. Accordingly, the increase in accuracy by the ratio metric measurement is achieved with almost negligible semiconductor area on the integrated circuit and only reasonable power consumption for the additional measurement of the current of the other resistor and the downstream connected calculator.

According to an embodiment, the current integration modulator may be a first order integrating modulator. Higher order modulators are also useful. A first order current integrating modulator comprises an integration amplifier and an integration capacitor which connects output and one of the inputs of the amplifier to form an analog integrator. A comparator is connected downstream or to the output of the integration amplifier. The comparator compares the integrator output with a threshold voltage. The comparator output drives a latch which is connected downstream of the comparator. The latch is operated with a determined oscillation frequency which may be in the range of megahertz, e.g. 2 MHz. The oscillation frequency may be provided by an on-chip RC-oscillator so that the oscillation frequency may vary with process variations and may exhibit temperature drift.

With a ratio metric measurement as explained above, the variation in oscillation frequency is cancelled. A controller generates multiple control signals to operate switches within the modulator including the first and second switches to connect the temperature-sensitive element and the other resistor, resp., to the modulator input. The controller generates the control signals in response to the output signal from the latch.

According to an embodiment, the temperature sensor arrangement may be used in an ambient light sensor that includes a photodiode to generate a current dependent on ambient light. The ambient light dependent current is input to the same current integrating modulator that operates the temperature sensor arrangement. Accordingly, a combined measurement of ambient light and temperature uses substantially the same elements such as the same current integrating modulator. Having an accurate temperature sensor according to an aspect of the present disclosure on the ambient light sensor integrated circuit allows to compensate the offset of the integration amplifier which causes the dark current of the integrator that is present when no light signal is input to the modulator. In operation, a temperature measurement may precede an ambient light measurement to perform an offset calibration or autozeroing of the inputs of the integration amplifier. As the offset voltage of the integration amplifier depends on temperature, an accurate temperature measurement allows an improved offset compensation and improved autozeroing of the integration amplifier. Practically, a temperature measurement precedes each cycle of autozeroing process and ambient light measurement. A combined temperature and ambient light sensor circuit according to an aspect of the present disclosure provides accurate temperature measurement and accurate ambient light measurement due to an accurate autozeroing procedure at almost no additional realization space on the integrated circuit and only very moderate additional power consumption.

According to an embodiment, the field of application of an ambient light sensor including a temperature sensor is in the area of mobile computing which includes mobile communication devices such as smartphones and tablet computers. The light sensor arrangement according to an aspect of the present disclosure is included in the mobile communication device to measure the ambient light and control the brightness of the display screen of the computing device, e.g., smartphones and tablet computers to provide a convenient appearance of the display to the user. If the measured ambient light amount is high, the brightness of the display of the mobile computing device is encreased; if the measured light amount is low, the brightness of the display screen is reduced. This enhances the usability of the device for the user with only moderate additional expense as explained above.

One or more of the above-mentioned objects is also achieved by a method to measure a temperature or to measure ambient light according to the features of claims 12 and 13, resp.

According to an embodiment, a method to measure a temperature comprises the generating of a current dependent from temperature using a resistor to determine a count value through a current integration modulation process. Another current is generated through another resistor to determine another count value through another current integrating modulation process. The generated count values are used to determine a value that is indicative of the temperature.

According to an embodiment, the temperature measurement process is performed by a current integrating modulation process that uses an integration amplifier. The integration amplifier inherently has an offset that causes a dark current through the integrator when no light is present at the photodiode. The offset compensation of the integration amplifier is performed using the temperature measurement. Then, a photocurrent generated in response to the ambient light received by a photodiode is generated and input to the current integration modulation process using an integration amplifier that is offset compensated employing the accurate temperature measurement. The current integration modulation process generates a count value that is representative of the ambient light received having enhanced accuracy due to an enhanced offset compensation based on the accurate temperature measurement.

It is to be understood that both the foregoing general description and the following detailed description are merely exemplary, and are intended to provide an overview or framework to understand the nature and character of the claims. The accompanying drawings are included to provide a further understanding and are incorporated in, and constitute a part of, this description. The drawings illustrate one or more embodiments, and together with the description serve to explain principles and operation of the various embodiments. The same elements in different figures of the drawings are denoted by the same reference signs.

DETAILED DESCRIPTION

The present disclosure will now be described more fully hereinafter with reference to the accompanying drawings showing embodiments of the disclosure. The disclosure may, however, be embodied in many different forms and should not be construed as limited to the embodiments set forth herein. Rather, these embodiments are provided so that the disclosure will fully convey the scope of the disclosure to those skilled in the art. The drawings are not necessarily drawn to scale but are configured to clearly illustrate the disclosure.

Figure 1:
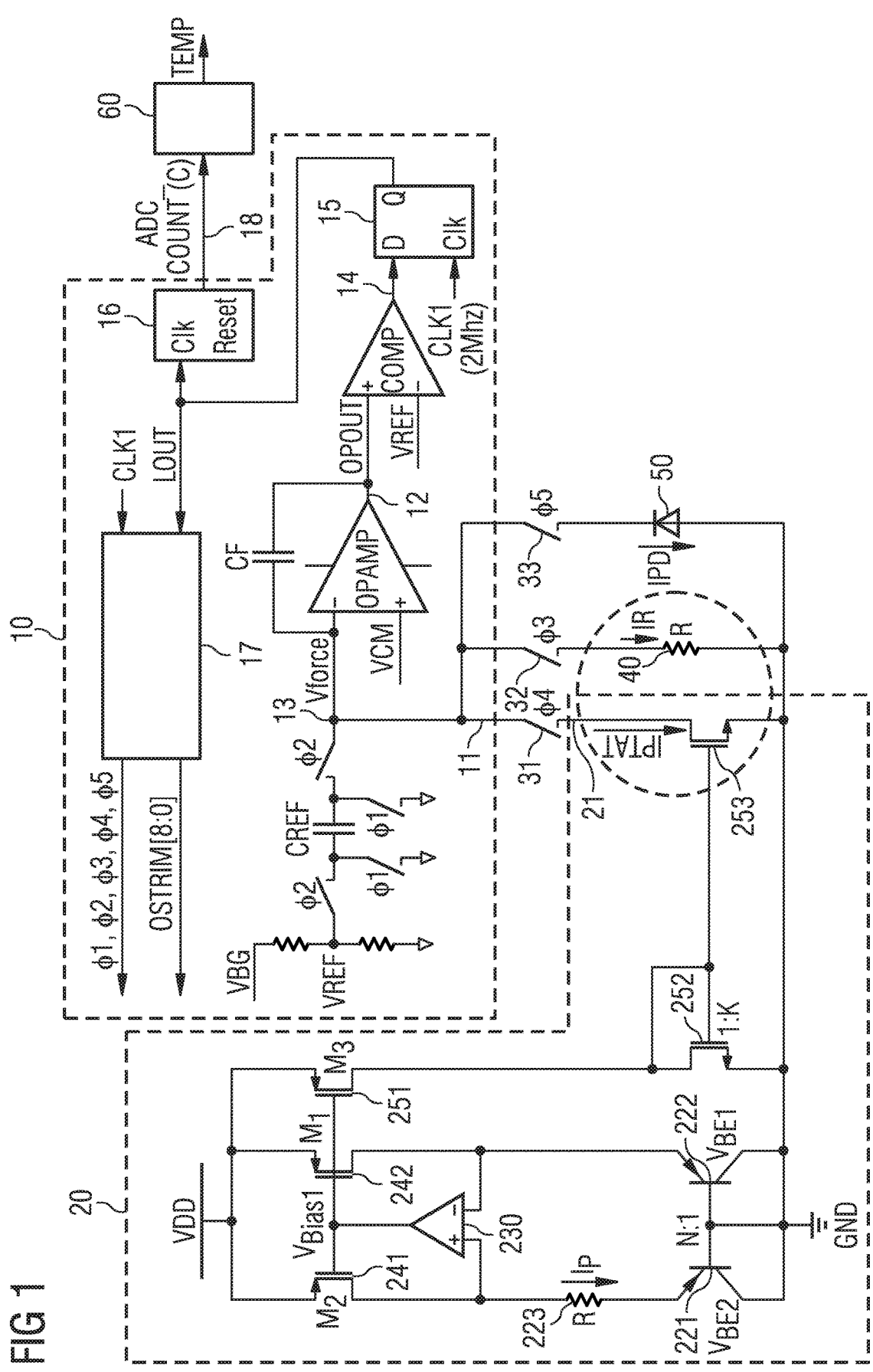
FIG. 1 shows a detailed circuit diagram of a combined temperature and ambient light sensor arrangement according to the principles of the present disclosure.

The combined ambient light sensor (ALS) and temperature sensor arrangement of FIG. 1 includes a current integrating modulator 10, a temperature sensor arrangement 20, a resistor 40 and a photodiode 50. The current integrating modulator 10 comprises an input terminal 11 to which a to-be-integrated current is supplied. The terminal 11 is connected to the input of an operational amplifier OPAMP. The amplifier OPAMP is configured as an integrator in that an integration capacitor CF is connected between its negative input "−" and its output terminal 12. The negative input terminal of the amplifier OPAMP carries the integration voltage Vforce present at the summing node 13 of the integrator. The positive input "+" of the amplifier OPAMP is supplied with a reference voltage VCM. The output 13 of the amplifier OPAMP drives the integration capacitor CF to achieve that Vforce=VCM+/−Voffset, wherein Voffset is the offset voltage of the operational amplifier OPAMP.

The output terminal 12 of the operational amplifier OPAMP is connected to the positive input "+" of a comparator COMP. The reference input or the negative input "−" of the comparator COMP is supplied with a reference voltage VREF. The output 14 of the comparator COMP is the data input of a latch 15 which is controlled by a clock signal CLK1. The clock signal may be generated on the chip by an RC oscillator having an oscillation frequency of about 2 MHz. The output Q of the latch 15 carries signal LOUT and controls the clock input Clk of a counter 16.

The latch output signal LOUT is also supplied to a controller 17. The controller 17 generates the control signals to operate the modulator 10 which includes the corresponding control logic and circuits to generate several clocks Φ1, Φ2, Φ3, Φ4, Φ5 used in the circuit.

The input node 11 is further connected to a reference capacitor CREF which is charged with the reference voltage VREF. During operation of the device, the switches connected to the reference capacitor CREF are controlled such that the reference charge is subtracted from the integration capacitor CF, when the output signal OPOUT of the operational amplifier OPAMP exceeds the threshold VREF at comparator COMP. The number of reference charge packages from reference capacitor CREF subtracted from integration capacitor CF is counted in counter 16 during a predetermined integration time window and is supplied as count value ADC_COUNT at the output 18 of counter 16. The count value ADC_COUNT is representative of the amount of current supplied to input 11.

The temperature sensor arrangement 20 supplies a current proportional to absolute temperature IPTAT at terminal 21. Terminal 21 is connected to the input terminal 11 of modulator 10 through switch 31 which is controlled by control signal Φ4. The temperature sensor arrangement 20 includes a bandgap device composed of two bipolar PNP transistors 221, 222 that are connected as diode devices, wherein the collector and base terminals of transistors 221, 222 are connected to each other. The relation of transistor sizes, e.g., the relation of the collector widths of transistors 221, 222 is N:1 so that transistor 221 drives N-times the current of transistor 222. The emitter of transistor 221 is connected to a resistor 223. The emitter path of transistor 222 includes no resistor. Transistors 221, 222 and resistor 223 form a bandgap device.

The temperature sensor 20 includes an amplifier 230, the inputs of which are connected to resistor 223 and the collector of transistor 222. Amplifier 230 controls PMOS transistors 241, 242 that are connected to the circuit paths of the bipolar transistors 221, 222. Furthermore, the output of amplifier 230 controls a transistor 251 which supplies a current that is mirrored through current mirror 252, 253 to the output 21 of the temperature sensor circuit 20. Basically, the amplifier 230 generates an output voltage $V_{Bias1}$ that controls a current through transistor 251 which is mirrored through transistor 252 to the transistor 253 that forms the output path of the current mirror. The drain source path of transistor 253 supplies the current proportional to ambient temperature IPTAT at terminal 21. During operation, when control signal Φ4 is active, the current IPTAT is supplied to input 11 of the current integrating modulator 10 so that modulator 10 generates a count value ADC_COUNT representative of the amount of current supplied to terminal 11.

After the measuring of the temperature-dependent current IPTAT, switch 31 is opened and switch 32 is closed through control signal Φ3 so that the current through resistor 40 is measured thereby providing another count value ADC_COUNT for the current through resistor 40. It is to be noted that resistors 223 and 40 are manufactured such that they have matching resistance values. For example, resistors 223 and 40 may have the same resistance value R. This is achieved in that resistors 223 and 40 are manufactured in the same manufacturing process using the same process steps in that resistors 223 and 40 are disposed on the same integrated circuit chip. As is apparent to a skilled artisan in the field of semiconductor circuit manufacturing, a predetermined matching factor between distinct ohmic resistors can be easily achieved. In practice, resistors 223, 40 may have the same resistance value R. It may also be useful to manufacture resistors 223, 40 such that they have a known ratio of resistance values. The ratio of resistance values of resistors 223, 40 may be N:1, . . . , 1:1, 1:2, . . . 1:N (N being integer or real). Provided that they are integrated on the same chip, the ratio is a well-controllable parameter during the manufacturing of the circuit.

The circuit shown in FIG. 1 performs two measurements. A first measurement is based on the current IPTAT and the corresponding count value ADC_COUNT is $C_{IPTAT}$.

Another, second measurement is based on the resistor 40 using the same modulator 10 generating a corresponding count value $C_{IR}$. The ratio of these two count values eliminates and cancels any errors in the absolute values that may be caused by process variations and temperature drifts of the elements used in the circuit, specifically the resistance values of the resistors 223, 40. Also, the variation in the capacitance values of the relevant capacitors such as CREF and CF and the operating clock signals CLK1 are cancelled out. The count values for $C_{IPTAT}$ and $C_{IR}$ may be represented with the following calculations:

$$IPTAT = \frac{\Delta VBE}{R}, \quad (1)$$

wherein $\Delta VBE = V_{BE1} - V_{BE2}$ with $V_{BE1}$ being the base-emitter voltage of transistor 222 and $V_{BE2}$ being the base-emitter voltage of transitor 221 and wherein R is the resistance value of resistor 223.

The modulator count ($C_{IPTAT}$) when the input current is IPTAT is given by $$C_{IPTAT}(\text{ADC\_COUNT}) = \frac{IPTAT * Atime}{CREF * (VREF - Vforce)} \quad (2)$$

$$C_{IPTAT}(\text{ADC\_COUNT}) = \frac{\Delta VBE * Atime}{R * CREF * (VREF - Vforce)}, \quad (3)$$

The modulator count ($C_{IR}$) when the input current is resistor current (IR) is given by $$C_{IR}(\text{ADC\_COUNT}) = \frac{I_R * Atime}{CREF * (VREF - Vforce)} \quad (4)$$

$$C_{IR}(\text{ADC\_COUNT}) = \frac{Vforce * Atime}{R * CREF * (VREF - Vforce)} \quad (5)$$

The parameter Atime represents the integration time window and is related to the clock signal CLK1 of, e.g., 2 MHz.

The temperature may be calculated from the ratio metric calculation $C_{IPTAT}/C_{IR}$ by a linear relation using formulas (3) and (5):

$$C_{ratio} = \frac{C_{IPTAT}}{C_{IR}} = \frac{\Delta VBE}{Vforce} \qquad (6)$$

$$T = A * C_{ratio} - B \qquad (7)$$

Formula (7) is a linear relation in the present case. Any other higher order (2nd, 3rd etc.) relation may also be useful. A simulation of current values $C_{IPTAT}$ and $C_{IR}$ resulting in $C_{ratio}$ for a temperature range between −40° C. to 80° C. is depicted in Tables 1 and 2 below.

TABLE 1

| Temp ° C. | Typical | | | Worst Power | | | Worst Speed | | |
|---|---|---|---|---|---|---|---|---|---|
| | $C_{IPTAT}$ | $C_{IR}$ | $C_{ratio}$ | $C_{IPTAT}$ | $C_{IR}$ | $C_{ratio}$ | $C_{IPTAT}$ | $C_{IR}$ | $C_{ratio}$ |
| −40 | 183 | 245 | 0.75 | 253 | 339 | 0.75 | 140 | 187 | 0.75 |
| −25 | 196 | 247 | 0.79 | 269 | 340 | 0.79 | 150 | 188 | 0.80 |
| −10 | 208 | 248 | 0.84 | 286 | 342 | 0.84 | 158 | 188 | 0.84 |
| 5 | 221 | 250 | 0.88 | 303 | 343 | 0.88 | 168 | 189 | 0.89 |
| 20 | 234 | 251 | 0.93 | 321 | 345 | 0.93 | 178 | 190 | 0.94 |
| 35 | 246 | 252 | 0.98 | 338 | 347 | 0.97 | 188 | 191 | 0.98 |
| 50 | 259 | 253 | 1.02 | 355 | 348 | 1.02 | 198 | 192 | 1.03 |
| 65 | 271 | 253 | 1.07 | 373 | 348 | 1.07 | 207 | 192 | 1.08 |
| 80 | 284 | 254 | 1.12 | 390 | 349 | 1.12 | 216 | 192 | 1.13 |

TABLE 2

| | Typical | Worst Power | Worst Speed | Typical | Worst Power | Worst Speed |
|---|---|---|---|---|---|---|
| Slope A | | | | | 323.30 | |
| Intercept B | | | | 280.60 | 279.92 | 283.22 |
| Temp ° C. | | $C_{ratio}$ | | Absolute Temperature Error in ° C. | | |
| −40 | 0.75 | 0.75 | 0.75 | −0.88 | −1.37 | 1.18 |
| −25 | 0.79 | 0.79 | 0.80 | −0.94 | −0.87 | 0.27 |
| −10 | 0.84 | 0.84 | 0.84 | −0.55 | −0.45 | 1.51 |
| 5 | 0.88 | 0.88 | 0.89 | −0.19 | −0.68 | 0.84 |
| 20 | 0.93 | 0.93 | 0.94 | −0.80 | −0.89 | 0.34 |
| 35 | 0.98 | 0.97 | 0.98 | 0.00 | 0.00 | 0.00 |
| 50 | 1.02 | 1.02 | 1.03 | −0.36 | 0.11 | −0.18 |
| 65 | 1.07 | 1.07 | 1.08 | −0.70 | −1.61 | −0.34 |
| 80 | 1.12 | 1.12 | 1.13 | −0.88 | −1.37 | −0.49 |

Max Error: 1.51° C.
Min Error: −1.61° C.

The simulation results show how much the temperature varies using the circuit of FIG. 1 including temperature sensor 20 and additional resistor 40. The calculation shows a typical situation, a worst power situation and a worst speed situation. Assuming that the temperature versus the ratio metric calculation of formula (6) exhibits a linear behavior according to formula (7), the same slope may be applied for all temperature samples and the intercept is calculated. The simulation demonstrates that the error in temperature is from −1.61° C. to 1.51° C. so that the temperature measurement is very accurate.

Turning back again to FIG. 1, a calculator 60 is provided which is connected to the output of the counter 16. The calculator 60 performs the calculation according to formula (7) and generates a digital value TEMP that represents the temperature measured by the circuit in FIG. 1.

The circuit of FIG. 1 may be further used to measure ambient light impinging on photodiode 50. Photodiode 50 generates a photocurrent IPD that is supplied to input terminal 11 of the current integration modulator 10 when control signal Φ5 is active and closes the corresponding switch 33. The photocurrent IPD is integrated with the same current integrating modulator 10 that performs the temperature measurement. In order to perform an accurate light measurement, the dark current at operational amplifier OPAMP, when no light impinges on diode 50, must be compensated. The offset compensation generates an offset trim value OSTRIM[8:0] that is forwarded as a correction value to operational amplifier OPAMP. The offset trim value depends on the temperature of the device so that the accurate ratio metric temperature measurement provided by temperature sensor arrangement 20 and additional resistor 40 is forwarded to the offset compensation process so that the accuracy of the autozeroing process to generate the offset compensation value OSTRIM[8:0] is increased.

Figure 2:
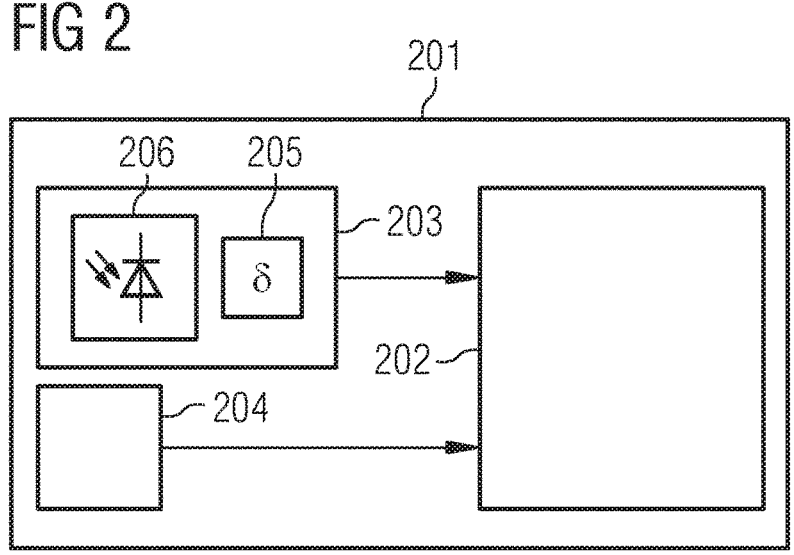
FIG. 2 shows a block diagram of a mobile computing device including the circuit of FIG. 1.

FIG. 2 depicts a technical application of the combined temperature and ambient light sensor shown in FIG. 1. FIG. 2 shows a mobile computing device 201 such as a tablet computer or a smartphone. Device 201 includes a display screen 202 which displays information generated by a processor 204. The combined temperature and ambient light sensor 203 controls the brightness of the display 202 in response to the ambient light sensing function 206 of the device 203. The temperature sensing function 205 of device 203 is used to perform an autozeroing process of the integration amplifier in the ambient light sensor modulator to compensate the dark current and obtain an accurate offset compensation.

Figure 3:
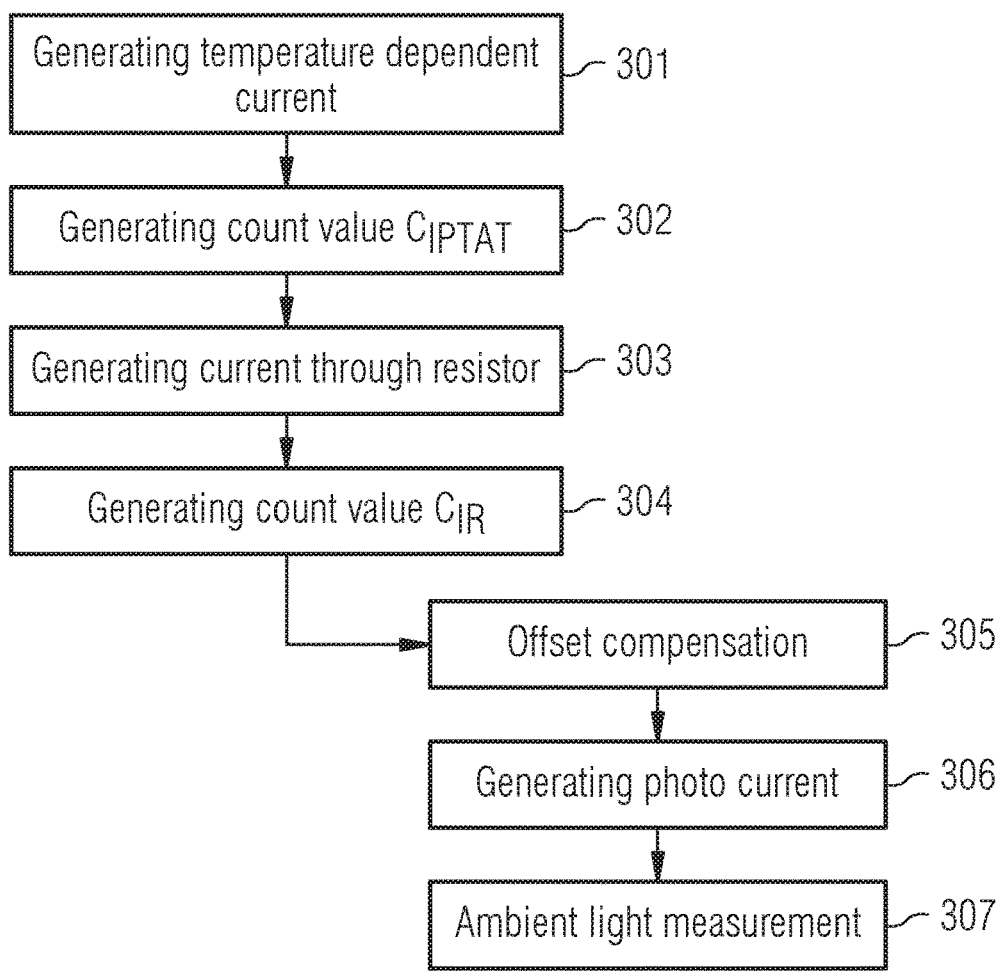
FIG. 3 shows a flowchart of a method to measure ambient light including the method to measure a temperature.

FIG. 3 depicts a process diagram of a method to operate the combined temperature and ambient light sensing device of FIG. 1. According to step 301, a temperature-dependent current is generated such as a current proportional to absolute temperature IPTAT. A corresponding count value $C_{IPTAT}$ is generated representative of the temperature-dependent current (step 302). Then, a current is generated through the resistor 40 (step 303) to generate a corresponding count value $C_{IR}$ (step 304). The count values are used to provide an accurate temperature to the offset compensation process (step 305). The offset compensation generates an offset trim value OSTRIM[8:0] to compensate the offset error of the operational amplifier OPAMP. Then, a photocurrent is generated in the photodiode 50 (step 306). The photo current is measured by the current integrating modulator 10 (step 307), wherein the ambient light measurement is relatively accurate since the offset compensation is accurate due to the accurate measurement of the temperature.

It will be apparent to those skilled in the art that various modifications and variations can be made without departing from the spirit or scope of the disclosure as laid down in the appended claims. Since modifications, combinations, sub-combinations and variations of the disclosed embodiments incorporating the spirt and substance of the disclosure may occur to the persons skilled in the art, the disclosure should be construed to include everything within the scope of the appended claims.

I claim:

1. A temperature sensor arrangement comprising:
   a current integrating modulator having an input terminal to receive a current signal and an output terminal to provide a count value dependent on the current supplied to the input terminal;
   a temperature sensitive element to generate a current dependent on temperature, the temperature sensitive element including a resistor;
   another resistor; and
   first and second switches to alternately connect the temperature sensitive element and the other resistor to the input terminal of the current integrating modulator
   wherein the temperature sensitive element comprises a bandgap temperature sensor having a first and a second path, the first path including a transistor and the resistor, the second path including another transistor, the transistor, the resistor and the other transistor form the bandgap temperature sensor, the transistor and the other transistor having different sizes, an amplifier connected to the first and second paths, a current mirror controlled by the output of the amplifier having an output path coupled to the input terminal of the current integrating modulator.

2. The temperature sensor arrangement according to claim 1, wherein the resistor and the other resistor have the same resistance.

3. The temperature sensor arrangement according to claim 1 or 2, wherein the resistor and the other resistor are disposed on the same integrated circuit.

4. The temperature sensor arrangement according to claim 1, wherein the first switch is connected between the temperature sensitive element and the input terminal of the current integrating modulator and the second switch is connected between the other resistor and the input terminal of the current integrating modulator, wherein the first and second switches are controlled to be conductive alternately.

5. The temperature sensor arrangement according to claim 1, further comprising a calculator connected downstream the current integrating modulator to generate a value representative of the temperature in response to a count value generated by the current integrating modulator from the temperature sensitive element and another count value generated by the current integrating modulator from the other resistor.

6. The temperature sensor arrangement according to claim 1, wherein the temperature sensitive element comprises a transistor to provide the current dependent on temperature, the serial connection of the drain-source path of the transistor and the first switch is connected to the input terminal of the current integrating modulator, and wherein the serial connection of the other resistor and the second switch is connected in parallel to the serial connection of the drain-source path of the transistor and the first switch.

7. The temperature sensor arrangement according to claim 1, wherein the transistor and the other transistor of the temperature sensitive element (20) have base and collector terminals connected together and having collectors of different widths, wherein the resistor is connected to the emitter terminal of the first transistor, wherein the amplifier controls a current through the current mirror having a transistor coupled to the input of the current integrating modulator through the first switch, wherein the resistor and the other resistor have matching resistance values.

8. The temperature sensor arrangement according to claim 1, wherein the current integrating modulator comprises an integration amplifier, an integration capacitor connected to the integration amplifier, a comparator connected downstream the integration amplifier, a latch connected downstream the comparator, a counter connected downstream the latch and a controller generating control signals in response to an output signal of the latch.

9. A light sensor arrangement comprising:
   a temperature sensor arrangement, comprising:
      a current integrating modulator having an input terminal to receive a current signal and an output terminal to provide a count value dependent on the current supplied to the input terminal;
      a temperature sensitive element to generate a current dependent on temperature, the temperature sensitive element including a resistor;
      another resistor; and
      first and second switches to alternately connect the temperature sensitive element and the other resistor to the input terminal of the current integrating modulator,
   wherein the current integrating modulator comprises an integration amplifier, an integration capacitor connected to the integration amplifier, a comparator connected downstream the integration amplifier, a latch connected downstream the comparator, a counter connected downstream the latch and a controller generating control signals in response to an output signal of the latch; and
   a photodiode coupled to the input terminal of the current integrating modulator through a switch, the current integrating modulator configured to perform an offset compensation of the integration amplifier in response to the count values generated for the temperature sensitive element and for the other resistor.

10. A mobile computing device comprising a light sensor arrangement, comprising:
    a temperature sensor arrangement, comprising:
       a current integrating modulator having an input terminal to receive a current signal and an output terminal to provide a count value dependent on the current supplied to the input terminal;

a temperature sensitive element to generate a current dependent on temperature, the temperature sensitive element including a resistor;

another resistor; and first and second switches to alternately connect the temperature sensitive element and the other resistor to the input terminal of the current integrating modulator, wherein the current integrating modulator comprises an integration amplifier, an integration capacitor connected to the integration amplifier, a comparator connected downstream the integration amplifier, a latch connected downstream the comparator, a counter connected downstream the latch and a controller generating control signals in response to an output signal of the latch; and a photodiode coupled to the input of the current integrating modulator through a switch, the current integrating modulator configured to perform an offset compensation of the integration amplifier in response to the count values generated for the temperature sensitive element and for the other resistor; and a display screen, wherein the light sensor arrangement comprises an output terminal to supply a signal indicative of ambient light, wherein the brightness of the display screen is controlled in dependence on the signal indicative of ambient light generated by the light sensor arrangement.

11. A method to measure a temperature comprising the steps of:

generating a current dependent from temperature using a temperature sensitive element including a resistor and determining a count value through a current integration modulation process;

generating another current through another resistor and determining another count value through another current integration modulation process; and generating a value indicative of the temperature from the count value and the other count value, wherein the temperature sensitive element comprises a bandgap temperature sensor having a first and a second path, the first path including a transistor and the resistor, the second path including another transistor, the transistor, the resistor and the other transistor form the bandgap temperature sensor, the transistor and the other transistor having different sizes, an amplifier connected to the first and second paths of the bandgap temperature sensor, a current mirror controlled by the output of the amplifier having an output path coupled to the input terminal of the current integrating modulator.

12. A method to measure ambient light comprising:

performing a method to measure a temperature comprising:

generating a current dependent from temperature using a temperature sensitive element including a resistor and determining a count value through a current integration modulation process;

generating another current through another resistor and determining another count value through another current integration modulation process; and generating a value indicative of the temperature from the count value and the other count value;

wherein the temperature sensitive element comprises a bandgap temperature sensor having a first and a second path, the first path including a transistor and the resistor, the second path including another transistor, the transistor, the resistor and the other transistor form the bandgap temperature sensor, the transistor and the other transistor having different sizes, an amplifier connected to the first and second paths of the bandgap temperature sensor, a current mirror controlled by the output of the amplifier having an output path coupled to the input terminal of the current integrating modulator;

the method to measure a temperature using an integration amplifier to perform the current integration modulation process; and performing an offset compensation of the integration amplifier using the measured temperature; and then generating a photocurrent in response to receiving ambient light by a photodiode and determining a count value representative of the received ambient light through a current integration modulation process using said integration amplifier.

* * * * *